(12) United States Patent
Scholze et al.

(10) Patent No.: US 11,628,532 B2
(45) Date of Patent: Apr. 18, 2023

(54) SYSTEM FOR MONITORING STANDARD PARTS

(71) Applicant: Agathon AG, Maschinenfabrik, Bellach (CH)

(72) Inventors: Stephan Scholze, Birmensdorf (CH); Dejan Seatovic, Winterthur (CH); Markus Allenspach, Lohn-Ammannsegg (CH); Stefan Nobs, Aarberg (CH)

(73) Assignee: AGATHON AG, MASCHINENFABRIK, Bellach (CH)

( * ) Notice: Subject to any disclaimer, the term of this patent is extended or adjusted under 35 U.S.C. 154(b) by 361 days.

(21) Appl. No.: 17/005,430

(22) Filed: Aug. 28, 2020

(65) Prior Publication Data
US 2021/0101243 A1 Apr. 8, 2021

(30) Foreign Application Priority Data
Oct. 3, 2019 (CH) ...................................... 1257/19

(51) Int. Cl.
*B23Q 17/22* (2006.01)
*B23Q 17/00* (2006.01)
*B23Q 17/24* (2006.01)

(52) U.S. Cl.
CPC ....... *B23Q 17/2216* (2013.01); *B23Q 17/005* (2013.01); *B23Q 17/2457* (2013.01); *B23Q 17/2476* (2013.01)

(58) Field of Classification Search
CPC .............. B23Q 17/2216; B23Q 17/005; B23Q 17/2457; B23Q 17/2476; B21D 37/12; B30B 15/0094; B30B 15/041; G05B 2219/45131; G01B 7/18; G01B 7/20; G01B 7/22; G01B 11/161; B21C 51/00; B29C 45/7653
See application file for complete search history.

(56) References Cited

U.S. PATENT DOCUMENTS 3,425,260 A * 2/1969 Anderson .............. B21J 13/025
72/403
4,491,027 A * 1/1985 Yalof .................... G01L 5/0076
73/862.52
(Continued)

FOREIGN PATENT DOCUMENTS

DE 4415577 A1 * 11/1995 ............. B21D 24/00
DE 4415577 A1 11/1995
(Continued)

OTHER PUBLICATIONS

SU-572318-A; Virzhonis Yuozas; Guiding Unit of Die Set; Sep. 15, 1977; EPO English Machine Translation; pp. 1-2 (Year: 2022).*

*Primary Examiner* — Bayan Salone
(74) *Attorney, Agent, or Firm* — Pearne & Gordon LLP (57) ABSTRACT

System for measuring misalignment of a tool (2) in a press device (1), the tool (2) comprises at least a first part (3) and a second part (4), which are movable relative to another in a guided manner by means of guide means comprising at least a guide pillar (10) provided in the first part (3) which is led in a guide bush (12) provided in the second part (4), wherein the system comprises measuring means (20) provided to detect misalignment of the tool (2). According to the invention, the measuring means (20) are mounted directly at the guide means.

12 Claims, 3 Drawing Sheets

(56) References Cited

U.S. PATENT DOCUMENTS

| | | | | |
|---|---|---|---|---|
| 8,464,591 B2 * | 6/2013 | Kuwayama | ............. | G01N 3/28 |
| | | | | 73/799 |
| 2009/0120151 A1 * | 5/2009 | Kuwayama | ............ | B21D 37/00 |
| | | | | 72/350 |

FOREIGN PATENT DOCUMENTS

| EP | 1980339 | A1 | * | 10/2008 | ............. | B21D 22/20 |
|---|---|---|---|---|---|---|
| EP | 1980339 | A1 | | 10/2008 | | |
| EP | 3042756 | A1 | * | 7/2016 | ............. | B21C 51/00 |
| EP | 3042756 | A1 | | 7/2016 | | |
| SU | 572318 | A | * | 9/1977 | | |

* cited by examiner

SYSTEM FOR MONITORING STANDARD PARTS

TECHNICAL FIELD

The invention relates to a system for monitoring standard parts, in particular for measuring misalignment of a tool in a press device used for stamping and/or molding, wherein deformation, deflection and/or strain of guiding means are measured.

BACKGROUND OF THE INVENTION

Press tools are used in hydraulic, pneumatic and/or mechanical presses to produce components, in particular sheet metal components in large numbers by blanking, piercing, bending, forming, punching etc. Machining devices for stamping, pressing or molding comprise either a stamping tool, a pressing tool, an injection-molding tool or a die-casting tool. In general, the tool comprises a plurality of plates, known as well as tool halves, movable relative to another and made up of at least a first part and a second part, in particular a punching or blanking die or a mold. The movement of the first part and the second part during a working stroke is guided by guiding means from a closed position, in which respective partition surfaces of the two parts are pressed against one another, into an open position and vice versa. The guiding means comprise guide pillars, for example mounted in the first part and which are led in corresponding guides, in particular guide bushes provided in the second part. Guide pillars and guide bushes form guiding means used to precisely guide and align the at least two parts of the tool such that they can be precisely centered in the closed position. Therefore, parallelism of surface pairs and supporting surfaces of the tool and the die set, in particular of the first part and the second part, are monitored to verify that the first and second parts are congruent and/or coincident positioned to each other. Furthermore, the rectangularity of the guide means can be ensured as well.

It is known, that the guide pillar is formed as a circularly cylindrical body protruding from the first part. The guiding bush provided in the second part can be formed by a cage with roll bodies, wherein the roll bodies can be balls or rollers, in particular inserted in rows. It is important, that the guiding means be configured free of clearance guiding of the guide pillar in the corresponding guide bush of the second part to be used for punching or molding tools with high quality requirements to the workpiece.

To further guarantee, that the first and second parts of the tool are precisely aligned to each other during closing and opening operations, additional centering devices can be provided. Nevertheless, the forces acting on the parts of the tool during pressing result in deformation not only on the tool itself but as well on the guiding means.

EP 1 980 339 A relates to a press-forming device and method which measure a strain of a tool occurring at the time of press working generated by a stamping force generated by the press, a reaction force generated by the material to be worked and a resulting deformation reaction which result in an elastic deformation of the tool. It is known from this document that a strain-measuring unit is provided inside a member of the press to be controlled, in particular a punch and/or a die of the press, to determine a strain magnitude of the previously mentioned member occurring during press forming. The strain-measuring unit can be provided as a piezoelectric sensor or a strain gauge or as a FBG sensor (Faber Bragg Grating sensor) using an optical fiber and can be configured to measure strain produced in one of the punches and/or dies of the stamping press. However, deviations from parallelism of surface pairs and/or rectangularity of guiding means in respect to the molds can occur for example as well when the tool is mounted in the press device and cannot be detected by the disclosed method.

EP 3 042 756 A describes a method to detect and determine an inclination of a cushion pad of a press machine. Information on a plurality of respective height positions in a vertical direction detected by height position detectors at a plurality of different horizontal positions can be used to calculate the inclination of the cushion pad of the die cushion device.

DE 4 415 577 A describes a device to compensate or adjust deflections in a press to achieve evenness of a tool holder. This device comprises a path sensor or bend sensor, in particular locally mounted at the location of greatest elastic deformation.

In summary, it is well known in the prior art to provide detection means in stamping tools and/or in the frame of press devices to detect deformations occurring during operations of the press device. However, detection means related to guide means such as guide pillars and guide bushes of a press device are hardly known. Errors or misalignments of the tool when mounting in the press device and during operation can result in inaccurate dimensions of the press formed articles and in damages or destruction of the forming or pressing tool or at least in increased wear of the forming or pressing tool and finally in higher costs due to the requirement to replace the tool. In particular, deviations in parallelism of surface pairs and/or supporting surfaces as well as deviations in the rectangularity of the guide pillars can cause severe problems in the precision of the formed articles.

Disclosure of the Invention

It is therefore an object of the present invention to provide a system for measuring tool misalignment in a press device during set-up and during operation. Hereinafter, the term press device is related to a press machine, a molding machine, or the like as well. In particular, the system is robust enough to withstand oil atmosphere and detergent, and can be used in operation with high acceleration and speeds and high stroke frequencies of the forming or pressing tool. It is another object of the present invention to provide a system, which is provided to determine not only deformation of the guide means with high accuracy but also to detect the direction of deformation.

According to the invention, these problems are solved by a system for measuring misalignment of standard parts used in a press device. Hereinafter, the term standard parts indicates guide means such as guide pillars and guide bushes for guidance of a tool in a press device, for example punching tool or injection mold. These guide means not only perform guidance within the tool but also exert a considerable influence on the dynamic behavior of the tools, in particular configured as a die and/or a matrix. Problems such as tilting of a die, wherein the axis of the matrix and the axis of the die of a press device are no longer aligned can have different reasons. For example, the tools, in particular the parts of the tool are not mounted such to be congruent to each other, leading to stress and deflection of the guide pillars. Furthermore, problems can occur during operation of the tool for example due to a backlash or due to thermic effects which can result in deviation from congruence, as well as due to uneven punching force along the length of the punching tool or due to tilting of one of the parts of the tool. Since the die press or mold press can show a certain amount of clearance of the guidance due to age and therefore the tool halves are no longer congruent to each other bending of guide pillars can result during operation. The system according to the invention is configured for measuring and monitoring misalignments such as deflection, deformation and/or deviation e.g. from rectangularity directly at the guide means, in particular at the guide pillars and/or guide bushes in the press device. Furthermore, the system is adapted to measure as well as a surface temperature of the guiding pillar and a direction of the deflection, deformation and/or deviation. Therefore, the measuring means are mounted at the guide means, particularly at a guide pillar, wherein the measuring means can be mounted in a fix manner or in an alternative embodiment releasable.

Several types of measuring means are known including types of sensors embedded or attached to structures to detect and monitor deformation, deflection or misalignment, preferably in an early stage to allow in-time intervention to avoid further damages. Known means for these purposes are strain gauge sensors, piezoelectric sensors and fiber optic sensors.

The system for measuring misalignment of a tool in a press device according to the invention comprises measuring means to monitor deflection, deformation and/or deviation as well as stress and/or temperature, mounted directly at the guide means, in particular a guide pillar. According to one embodiment of the invention, from a free end of at least one guide pillar a longitudinal bore is provided, preferably configured as a blind hole or a through-hole coaxial to a longitudinal axis of the guide pillar. The longitudinal bore is configured to accommodate measuring means, wherein a diameter d1 of the longitudinal bore is small compared to a diameter of the guide pillar. In particular, the diameter of the longitudinal bore d1 is in the range of 0.1 to 10.0 mm.

One type of suitable measuring means is a strain gauge with a surface stress-sensing element. In general, strain gauges comprise a thin metallic pattern or semiconductor whose resistance, capacity or the like changes markedly when it is deformed. The deformation is usually taken to be a measurement of strain and hence of a force applied to a structure to which the strain gauge is attached. A strain gauge sensor is provided on a structure to perform a precise and reproducible measurement of the stress changes and is known for measuring for example acceleration, pressure, tension and force. Different types of strain gauges are known such as semiconductor strain gauge, nanoparticle strain gauge and/or capacitive strain gauge as well as fiber optic sensing to measure strain along an optical fiber.

According to one embodiment of the invention, the measurement means are configured as strain gauge sensors, wherein at least one strain gauge is attached to a pillar shaped substrate forming the sensor, which can be accommodated in the longitudinal bore of at least one guide pillar. The pillar shaped substrate and the at least one strain gauge may be made in one piece using appropriate technology. However, they may be manufactured separately and thereafter connected to each other by welding, gluing or other well-known technology. Furthermore, the pillar shaped substrate can be configured as a flexible cylinder and can be positioned at any appropriate position in the longitudinal bore of at least one guide pillar. Advantageously, the pillar shaped substrate can be configured with a stiffness, which is less than the guide pillar, in particular, the stiffness is about at least one order of magnitude lower than the stiffness of the guide pillar. Hence, deformation of the guide pillar is transferred to the substrate without resistance or loss. Preferably, the pillar shaped substrate is configured as a cylinder extending from top to bottom of the longitudinal bore, in particular from the free end of the guide pillar to the end of the blind hole or its bearing in the first and/or second part of the tool. The strain gauge sensor is fixedly mounted in the longitudinal bore of the guide pillar, in particular on the top or free end and on the opposite end, in particular the bottom of the guide pillar via holding means. Holding means can be provided as threads, clamping means, adhesives etc.

The strain gauge can be designed as a printed, deposited, or laser-structured strain gauge. In one embodiment of a strain gauge sensor a 3D printing technology for conductive materials is used for printing the strain gauge sensor. By directly printing of sensor structures on the substrate material a high design freedom and flexibility are achieved.

Appropriate deposition methods comprise applying a deposition mask on a substrate surface of the pillar shaped structure of the sensor and depositing a strain-gauge material that has an electrical resistance that changes as a function of stress on at least one portion of the substrate surface exposed by apertures in the deposition mask. The deposition can be conducted by chemical vapor deposition and/or physical vapor deposition. The depositing method can use laser-patterned masks and vapor deposited layers of dielectric material and sputtered conductive films to manufacture highly sensitive strain gauges on substrate surfaces of varying composition.

Strain gauges can also be manufactured by laser material removal of a homogenous conductive film, wherein in a first step the conductive film is homogenous deposited on the substrate surface, e.g. by vacuum deposition. In a following step, the conductive material is removed such that the measurement structure is formed with insulating material in between.

To detect precisely the change in resistance it is known that four strain gauges are connected in a bridge arrangement and to measure the differential voltage between center terminals. Preferably, at least two strain gauge sensors are attached to opposite sides of the pillar shaped substrate accommodated in the longitudinal bore of at least one guide pillar subjected to a bending force, so that opposite pairs are in compression or tension, giving the maximum differential voltage for a given strain. In some cases, it might be necessary to consider the effect of the temperature on the resistance of the metal conductors, for example as an error factor or to provide a certain configuration of all strain gauges and/or strain gauge sensors.

Using strain gauge sensors as measurement means have some major benefits such that these sensors and their application are state-of-the-art and therefore can be established in an easy way, that no or only few size constraints have to be considered, their fabrication is inexpensive and offers a high flexibility in sensor designs and the possibility to print these sensing elements on almost any surface.

In another embodiment according to the invention, measuring means inserted into the longitudinal bore of at least one guide pillar are configured as a capacitor sensor. The capacitor sensor includes a first cylinder with a first end surface and a second cylinder with a second end surface inserted into the longitudinal bore and fixed respectively to the ends of the guide pillar by holding means such that the first end surface and the second end surface are oriented parallel to each other in a predetermined distance. Preferably, the first and the second end surface are generated by diagonally cutting a cylinder into the first cylinder and the second cylinder such that areas of the end surfaces are increased as well as the capacity of the capacitor sensor. The first cylinder and the second cylinder represent the plates of a capacitor, in particular two conducting elements of e.g. metal or conductive polymers separated a short distance from each other by a dielectric such as a liquid, a gas, e.g. air, or a solid. The distance between the two conducting elements, in particular the first end surface as one capacitor plate and the second end surface as another capacitor plate, changes due to deformation of the at least one guide pillar equipped with the capacitor sensor introduced by external force. Alternatively, additional forms of capacitor plates can be provided, in particular for narrow bores. For example, longitudinal capacitor plates can form a two fitting comb structure and variations thereof. The capacitor plates of the capacitor sensor will experience translation and rotation due to deformation or position deviation of the guide means, which will affect the distance between the capacitor plates. The deformation generating the change in distance can be detected by measuring the variation of the electrical resistance values of the capacitor and can be evaluated in respect to the magnitude of displacement and preferably as well to the direction of the displacement or deflection.

Variations of electrical resistance values are determined by measuring a capacitor voltage-step response of a charging and discharging process in respect to a known rectangular signal generated as an original signal of a predetermined frequency or reference frequency by an oscillator. Variation of capacitance values is directly related to the distance between the capacitor plates of the capacitor sensor. According to the embodiment, two basic RC circuits including each a resistor of equal resistance value but differing in the capacitance value of the included capacitors, in particular a reference capacitor and the capacitor subjected to deformation are used to determine the charging and discharging behavior. Since the area of the capacitor plates and the resistance of the included resistors remain constant, variation of the distance between the capacitor plates will generate variation in the detected signals. These can be precisely measured in relation to the original signal and the reference capacitor.

The advantage by using the difference between the so-called post-deformation frequency and the reference frequency is to minimize all sources of possible errors. It is known, that the oscillation frequency of an oscillation circuit is a frequency according to the impedance including the inductive component and the capacitive component between the electrodes in addition to the electrical resistance component between the electrodes. Since inductive component and resistive component are constant, the oscillation frequency is only influenced by a change in capacity of the circuit. The difference between the frequency after deformation and the reference frequency substantially corresponds to the difference between only the electrical capacity of the sensor unit before and after the deformation and is thus directly related to the distance between the plates of the capacitor sensor unit. The signal noise and external error sources can be minimized by using the difference as a measurement setup.

In another embodiment according to the invention, measuring means accommodated into the longitudinal bore of at least one guide pillar are configured as a fiber optic sensor. The fiber optic sensor is configured to measure strain along an optical fiber, which can be embedded into the longitudinal bore provided in at least one of the guide pillars. In general, optical sensor devices are based on detecting modifications or modulations in some characteristics of light. Transmitted or reflected light can be modulated by changes in its amplitude, phase, frequency and/or polarization state. Fiber optic sensors are immune to electromagnetic interferences, chemically inert, withstand high temperatures and are potentially small and lightweight as well as they show excellent transmission capabilities and can provide a plurality of measuring points along a single optical fiber, which can be multiplexed to offer distributed measuring with great spatial resolution.

In general, a fiber optic sensor comprises integral or separated a transducer device with at least one measuring fiber, an optical connection and a process unit.

One design of a fiber optic sensor for measuring deformation of the guide pillar is configured with one fiber, called the measurement fiber, in mechanical contact with the pillar shaped structure itself. It is attached with its two ends and preferably pre-loaded between them. Alternatively, more than one measurement fiber can be provided. Due to bending of the measuring means by deformation of the pillar shaped structure the one measurement fiber is elongated. The measurement fiber can be configured to provide multiple measuring points by implementing several optical reflections along the length of the measurement fiber.

Another embodiment of the measuring means comprises another fiber, the so-called reference fiber, which is placed loosely within the same pillar shaped structure and therefore its length is not affected by deformation and/or bending. The measurement fiber and the reference fiber can be implemented in one measuring means, in particular in one pillar shaped structure. Advantageously, in this embodiment a temperature induced change in length is equal for the measurement fiber and the reference fiber, respectively and therefore no further temperature compensation has to be considered.

Alternatively, the measurement fiber is implemented in the measurement means while the reference fiber can be arranged independently such that the space requirements for the measurement means are small. Light from a light source is guided to the sensor and back to a process unit by guide elements, wherein the guide elements are at least optical fibers and optical coupling means.

The process unit of the measuring means can comprise an interferometer such as a Fabry-Pérot interferometer and furthermore a transducer unit to convert an optical signal from the measurement fiber into an electrical signal and an electrical signal processor for further processing the signals received. According to one embodiment the Fabry-Pérot interferometer can be configured to be used with one or several or a continuous distribution of wavelengths. This allows absolute measurements of elongations of the measurement fiber, which values are larger than the wavelengths of the used light.

Another design is based on Fiber Bragg Grating Technology to measure both strain and temperature, an optical fiber is used with a periodic refractive index perturbation pattern inscribed in the core such that it diffracts the optical signal in the guided mode at specific wavelengths into other modes. Other designs of optical fiber sensors have been proposed to provide an interaction zone between the light and a measurand.

Another type of fiber optic sensor is the low-coherence interferometer, based on dividing the power of a low-coherence source into a measurement fiber and a reference fiber of the interferometer through a fiber coupler. The light reflected by reflectors in the structure is recollected by the measurement fiber, the light from both the measurement fiber and the reference fiber is coupled back in the fiber coupler and part of it is redirected towards a detector. Due to the finite coherence length of the source, optical interference is observed only when the optical path lengths of the light beams reflected by the structure reflector and the reference mirror differ from less than the coherence length.

According to one embodiment of the invention, the measuring means are configured as sensor units modulating an electrical property, e.g. resistance and/or capacity and therefore are provided as passive. These sensors are powered by electrical energy and the generated signals are transmitted and processed, in particular by an amplification and a processing unit. The connection of the sensor units with a power source and/or the processing unit can be provided by wire-bound transfer or by wireless transfer.

According to a preferred embodiment of the invention, the measuring means of the system are adapted to determine deformation, deflection and/or deviations from rectangularity of the at least guide pillar in respect of the first part of the tool, in particular a magnitude of the deviation and direction of the deviation. Deviations can be determined during set-up of the tool and during operation of the press device.

Furthermore, the measuring means are adapted to be connected to a process unit to transmit signals via wireless transmission.

In another embodiment, temperature can be measured by measuring means and measuring methods known from the state-of-art, in particular using platinum resistance thermometers. The temperature is detected independently from measuring of deformation of the guide pillars. Therefore, a temperature correction can be applied directly to signals from strain gauge resistance, light structure, wavelength and/or capacity through an evaluation unit or the process unit.

According to the invention, directions of deformations acting on guide pillars can be computed through a geometrical alignment of measuring means within the guide pillars and a deformation magnitude can be evaluated based on their longitudinal extension and/or compression. Further, orientation of measuring means relative to the tool can be defined mechanically and/or can be determined by a calibration step to be performed. By aligning the detected direction of deformation to the tool's coordinate system, it is possible to align exactly the guide pillar's base in its socket.

Embodiments of the system for measuring misalignment of a tool in a press device according to the invention will be explained more closely in the following with reference to the drawings:

DETAILED DESCRIPTION OF THE INVENTION

Figure 1:
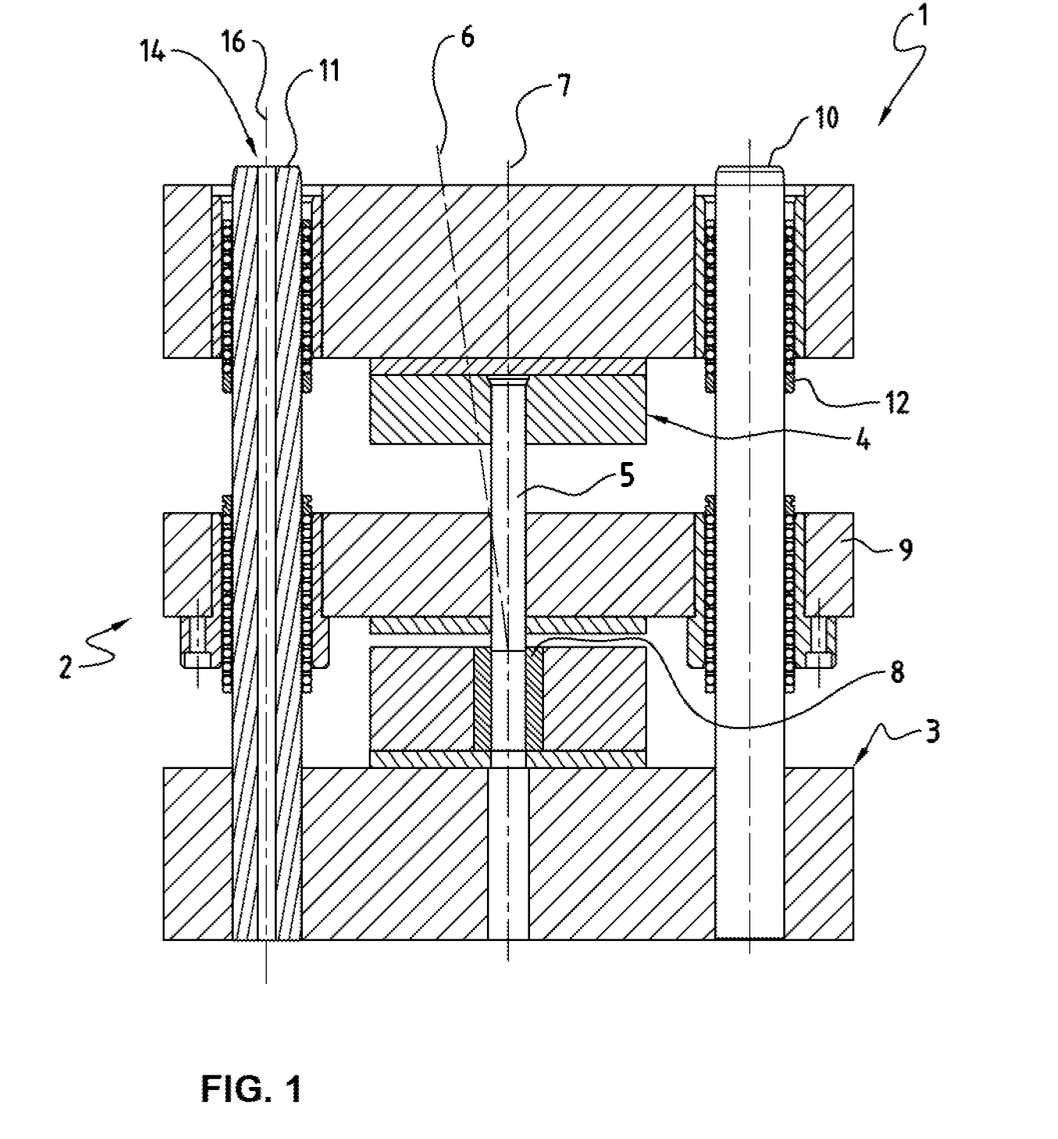
FIG. 1 shows a longitudinal section through a press device comprising a tool, in particular a first part and a second part, movable relative to another in a guided manner by means of guide means.

Shown in FIG. 1 is a die-set structure of a press device 1, comprising a tool 2. The tool 2 comprises depending on the complexitiy of the tool 2 a plurality of plates put together and made up of at least a first part 3 or first mold half and a second part 4 or second half mold, in particular a blanking or punching die or a mold. In FIG. 1 the die set structure comprises a matrix indicated by 8 and a die guide plate indicated by 9. The first and second parts 3, 4 of the tool 2 can be moved in a guided way by guide means relative to each other from a closed position to an open position and vice versa. In general, guide means are used in tool or injection mold constructions and in machine apparatus and device constructions when high guidance accuracy is required.

In tool 2 the first part 3, which can bear guide pillars 10, can be separated from the second part 4, which is provided with corresponding guides, particular guide bushes 12 for receiving the guide pillars 10 in which the guide pillars 10 are led, for example by means of ball bearings in cages.

If the die-set structure is used for a molding operation a mold can be attached on separating surfaces of the first part 3 and/or the second part 4 which is filled in the closed position of the tool 2 with a material to be formed like a cast material which is pressed into the mold, in particular in a horizontal direction. After opening the mold, the so-called preform can be removed from the mold.

Furthermore, the die-set structure can be used for a blanking and/or punching operation.

By setting-up the tool 2 in the press device 1 parallelism of surface pairs and of supporting surfaces have to be carefully maintained. FIG. 1 shows the tool 2 further comprising a die 5, in particular a stamping tool or punch, guided in the die guide plated 9. As illustrated in this figure deviation of the plates 3, 4 from congruency, backlash of the guiding of the tool 2 or deviation from angularity of the support of the guiding means can result in a tilted matrix axis 6. Further, if the guide means, in particular the guide pillars 10, are deflected and/or deviate from rectangularity further deviation from congruency and misalignment of the first part 3 and the second part 4 to each other can occur.

According to the invention, measurement means for measuring misalignment of a standard parts such as a guide pillar 10 are provided. Therefore, a longitudinal bore 14 extending from the one end of the guide pillar 10, e.g. a free end and coaxially to the guide pillar axis 16 is provided, wherein a diameter of the longitudinal bore 14 is smaller than a diameter of the guide pillar 10. Inserted into the longitudinal bore 14 is a measuring means (not shown) as described in detail later.

Figure 2:
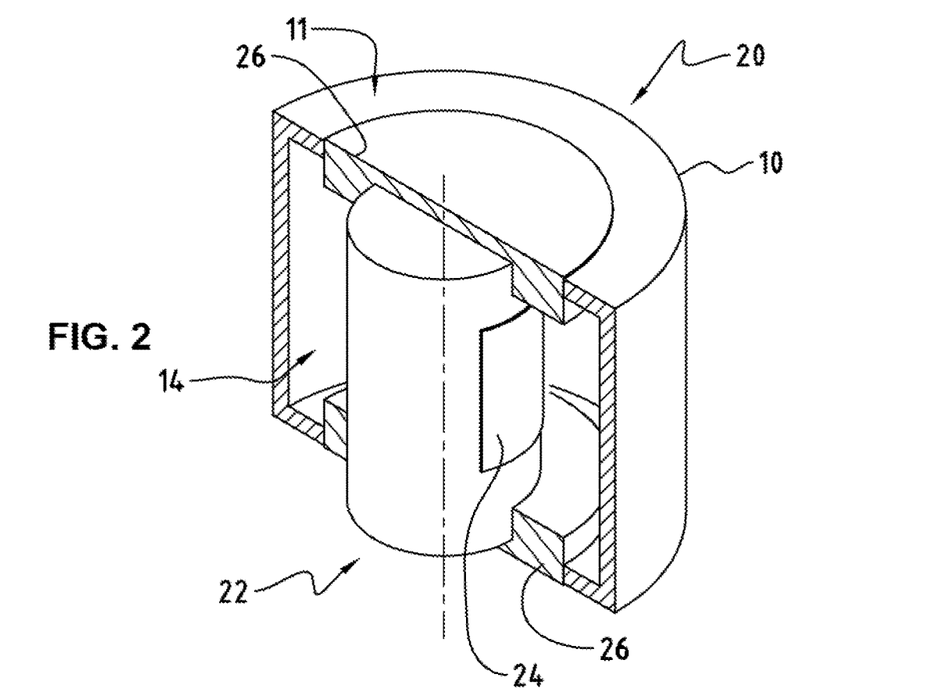
FIG. 2 is a perspective view of a longitudinal section through a sensor according to a first embodiment of the invention.

FIG. 2 shows a perspective view of a longitudinal section through a measurement means 20 according to a first embodiment of the invention. The measuring means 20 comprises a pillar shaped structure 22 on which a surface sensing element in form of a strain gauge 24 is attached, forming a strain gauge sensor. The measuring means 20 is configured to be inserted into the longitudinal bore 14 of the guide pillar 10 and to be fixedly mounted to the end regions of the guide pillar 10 by holding elements. Therefore, at end regions of the pillar shaped structure 22 ring shaped elements 26 can be provided, which come to abut against the end faces 11 of the guide pillar 10 when the pillar shaped structure 22 is fully pushed into the longitudinal bore 14 and can be fixedly mounted in position e.g. by press fitting.

At a circumference of the pillar shaped structure 22 at least one strain gauge 24 is provided. Preferably, two strain gauges 24 are attached in pairs on opposite sides of the pillar shaped structure 22 such that both can detect compression and tension depending on the direction of deflection of the guide pillar 10.

Figure 3:
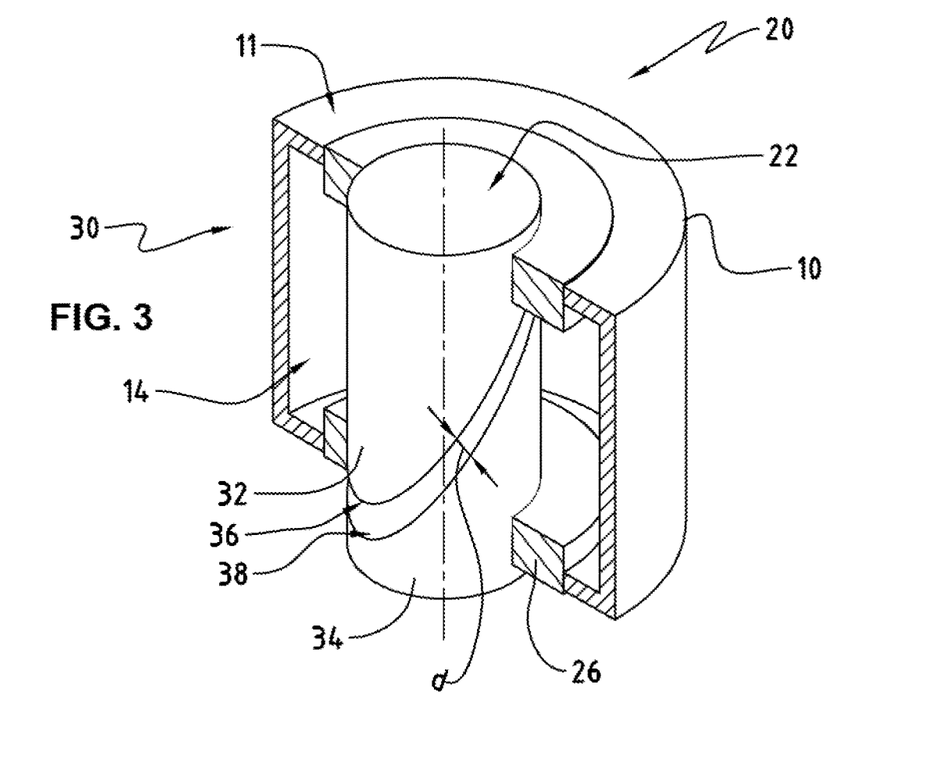
FIG. 3 is a perspective view of a longitudinal section through a sensor according to a second embodiment of the invention.

FIG. 3 shows a measurement means 20 according to a second embodiment of the invention wherein similar elements as in the first embodiment are characterized equivalently. The measurement means 20 is configured as a capacitive sensor 30 comprising a first cylinder 32 and a second cylinder 34 wherein a first surface of the first cylinder 32 provides a first capacitor plate 36 and a second surface of the second cylinder 34 provides a second capacitor plate 38 separated to each other by a distance d. If the guide pillar 10, in which the capacitive sensor 30 is embedded in any appropriate way in the longitudinal bore 14, is subjected to deformation or deflection the first and/or second capacitor plates 36, 38 will experience translation and/or rotation, which will affect the distance d and thus directly the determined capacitance of the capacitor sensor 30.

Figure 4A:
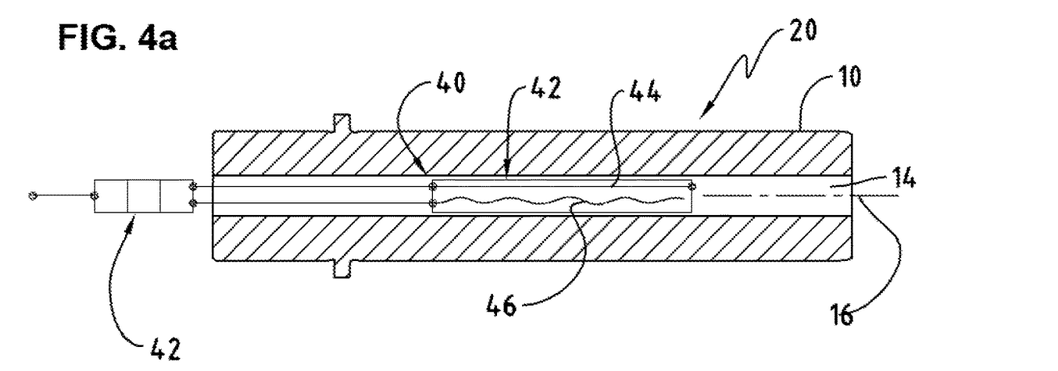
FIG. 4a is a schematic view of a guide pillar with a sensor according to a third embodiment of the invention.
Figure 4B:
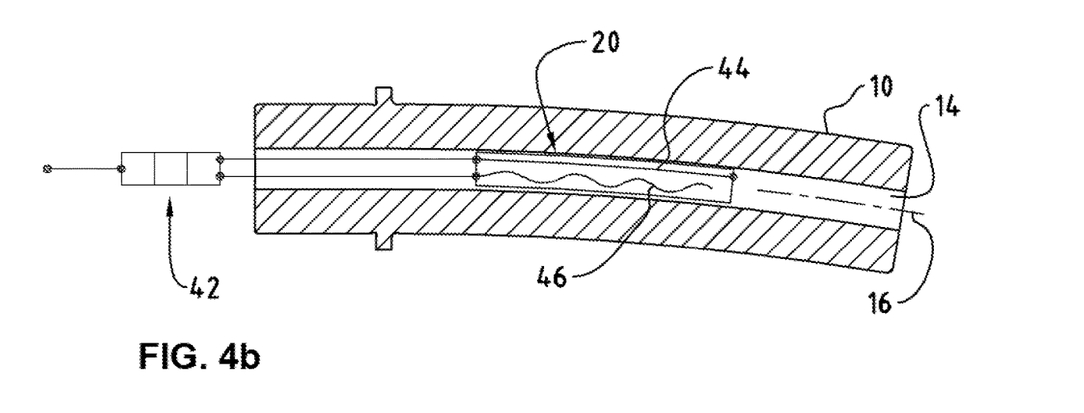
FIG. 4b is a schematic view of the guide pillar with the sensor according to FIG. 4a in a deflected position.

FIGS. 4a and 4b shows a measurement means 20 according to a third embodiment of the invention. The FIGS. 4a and 4b show schematically a guide pillar 10 in which a fiber optic sensor 40 is embedded in the longitudinal bore 14 coaxially with the guide pillar axis 16. The optical sensor 40 is configured as a fiber optic sensor, in particular as an interferometric sensor comprising a process unit 42 comprising inter alia an interferometer such as a Fabry-Pérot-Interferometer, a transducer to convert an optical signal into an electrical signal and a processor. For example light from a low-coherence source (not shown) is divided into a measurement fiber 44 and a reference fiber 46 arranged inside of the measuring means 20. The measurement fiber 44 is connected to the measuring means 20 such that during bending the measurement fiber 44 is elongated. FIG. 4a shows the guide pillar 10 in a straight position. FIG. 4b shows the guide pillar 10 subjected to deflection that can be detected by the fiber optic sensor 40.

Although the present disclosure has been described with reference to particular means, materials and embodiments, one skilled in the art can easily ascertain from the foregoing description characteristics of the present disclosure, while various changes and modifications may be made to adapt the various uses and characteristics as set forth in the following claims.

The invention claimed is:

1. A system for measuring misalignment of a tool in a press device, the tool comprising a first part and a second part, which are movable relative to one another in a guided manner by guide means comprising a guide pillar extending from first part which is led in a guide bush provided in the second part, the system comprising a sensor adapted to detect misalignment of the tool, wherein the sensor is mounted directly at the guide means and is adapted to determine deviations in magnitude and direction from rectangularity of the guide pillar in respect of the first part of the tool.

2. The system according to claim 1, wherein the sensor is mounted mounted at the guide pillar.

3. The system according to claim 1, wherein the sensor is mounted in a longitudinal bore provided in the guide pillar.

4. The system according to claim 3, wherein the sensor is fixedly secured in the longitudinal bore by holding elements.

5. The system according to claim 1, wherein the sensor is configured as a strain gauge sensor comprising a pillar shaped structure and at least one strain gauge attached to the pillar shaped structure.

6. The system according to claim 5, wherein a pair of strain gauges are attached on opposite sides of the pillar shaped structure.

7. The system according to claim 1, wherein the sensor is configured as a capacitive sensor comprising a first cylinder with a first capacitive plate and a second cylinder with a second capacitive plate separated from each other by a distance (d).

8. The system according to claim 1, wherein the sensor is configured as a fiber optic sensor.

9. The system according to claim 8, wherein the fiber optic sensor is configured as a low-coherence interferometric sensor.

10. A system for measuring misalignment of a tool in a press device, the tool comprising a first part and a second part, which are movable relative to one another in a guided manner by guide means comprising a guide pillar extending from first part which is led in a guide bush provided in the second part, the system comprising a sensor adapted to detect misalignment of the tool, during set-up of the tool, wherein the sensor is mounted directly at the guide means.

11. The system according to claim 1, wherein the sensor is adapted to be connected to a processing unit to transmit signals via wireless transmission.

12. A system for measuring misalignment of a tool in a press device, the tool comprising a first part and a second part, which are movable relative to one another in a guided manner by guide means comprising a guide pillar extending from first part which is led in a guide bush provided in the second part, the system comprising a sensor adapted to detect misalignment of the tool, configured to determine a temperature of the guide pillar to which it is attached.

* * * * *

UNITED STATES PATENT AND TRADEMARK OFFICE
CERTIFICATE OF CORRECTION

PATENT NO. : 11,628,532 B2
APPLICATION NO. : 17/005430
DATED : April 18, 2023
INVENTOR(S) : Stephan Scholze et al.

It is certified that error appears in the above-identified patent and that said Letters Patent is hereby corrected as shown below:

In the Claims

Column 10; Line 6: Claim 6:
Please amend "mounted mounted at the guide" to read -- mounted at the guide --

Column 10; Line 43: Claim 12:
Please amend "from first part which is led" to read -- from the first part which is led --

Column 10; Line 45: Claim 12:
Please amend "the tool, configured to determine" to read -- the tool, wherein the sensor is mounted directly at the guide means, and is configured to determine --

Signed and Sealed this
Second Day of January, 2024

Katherine Kelly Vidal
*Director of the United States Patent and Trademark Office*